US012694863B2

(12) United States Patent
Lahr et al.

(10) Patent No.: US 12,694,863 B2
(45) Date of Patent: Jul. 28, 2026

(54) MODIFYING AN AUDIO SIGNAL TO INCORPORATE A NATURAL-SOUNDING INTONATION

(71) Applicant: AuthenticVoice Inc., Snoqualmie, WA (US)

(72) Inventors: Nils B. Lahr, Snoqualmie, WA (US); Michael Walter Zirinsky, Schwenksville, PA (US)

(73) Assignee: AuthenticVoice Inc., Snoqualmie, WA (US)

( * ) Notice: Subject to any disclaimer, the term of this patent is extended or adjusted under 35 U.S.C. 154(b) by 278 days.

(21) Appl. No.: 18/201,899

(22) Filed: May 25, 2023

(65) Prior Publication Data

US 2023/0386446 A1 Nov. 30, 2023

Related U.S. Application Data

(60) Provisional application No. 63/345,578, filed on May 25, 2022.

(51) Int. Cl.

| | |
|---|---|
| ***G10L 13/033*** | (2013.01) |
| ***G10L 13/047*** | (2013.01) |
| ***G10L 21/003*** | (2013.01) |
| *G10L 25/30* | (2013.01) |

(52) U.S. Cl.

CPC ........ *G10L 13/0335* (2013.01); *G10L 13/047* (2013.01); *G10L 21/003* (2013.01); *G10L 25/30* (2013.01)

(58) Field of Classification Search

None

See application file for complete search history.

(56) References Cited

U.S. PATENT DOCUMENTS

| | | | | |
|---|---|---|---|---|
| 2002/0110248 A1* | 8/2002 | Kovales | G10L 13/00 | 381/56 |
| 2003/0163316 A1* | 8/2003 | Addison | G10L 13/10 | 704/260 |
| 2025/0061884 A1* | 2/2025 | Guo | G10L 15/065 | |

FOREIGN PATENT DOCUMENTS

| | | | |
|---|---|---|---|
| CN | 110534121 A * | 12/2019 | G10L 19/02 |
| CN | 111370024 A * | 7/2020 | G10L 21/003 |
| CN | 113112996 A * | 7/2021 | G10L 13/08 |

OTHER PUBLICATIONS

Masoodian et al. "TRAED: Speech Audio Editing using Imperfect Transcripts" 2006 The University of Waikato (Year: 2006).*

* cited by examiner

*Primary Examiner* — Pierre Louis Desir

(74) *Attorney, Agent, or Firm* — Workman Nydegger

(57) ABSTRACT

Techniques for modifying intonations in audio files are disclosed. A first audio waveform and a second audio waveform are accessed. A first intonation in the first audio waveform is identified, and a second intonation in the second audio waveform is identified. The first and second intonations correspond to the same unit of pronunciation. The first intonation is modified until it sufficiently matches the second intonation.

19 Claims, 11 Drawing Sheets

MODIFYING AN AUDIO SIGNAL TO INCORPORATE A NATURAL-SOUNDING INTONATION

CROSS-REFERENCE TO RELATED APPLICATIONS

This application claims the benefit of and priority to U.S. Provisional Patent Application Ser. No. 63/345,578 filed on May 25, 2022 and entitled "MODIFYING AN AUDIO SIGNAL TO INCORPORATE A NATURAL-SOUNDING INTONATION," which application is expressly incorporated herein by reference in its entirety.

BACKGROUND

Audio editing refers to the process of altering or editing an audio signal to modify that signal's attributes. For instance, editing can be performed to amplify the sound or even to remove noise in the signal. Different editing techniques can be used, such as amplification, normalization, compression, equalization, limiting, panning, and stereo imaging.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for dynamically modifying intonations in a first audio waveform to match intonations that are detected in a second audio waveform, said method including: accessing a first audio waveform representing output from a text-to-speech generator operating on a source of text; accessing a second audio waveform representing a recording of a human reading the source of text; identifying a first set of intonations embodied within the first audio waveform, the first set of intonations being enunciated for syllables within the source of text; identifying a second set of intonations embodied within the second waveform, the second set of intonations being enunciated for the same syllables; for each respective syllable in said syllables, detecting a corresponding matching pair of intonations, wherein said corresponding matching pair of intonations includes an intonation from the first set of intonations for said each respective syllable and an intonation from the second set of intonations for said each respective syllable; and for each respective syllable in said syllables, modifying said each respective syllable's corresponding matching pair of intonations by causing that matching pair's intonation from the first set of intonations to match, within a predefined threshold, that matching pair's intonation from the second set of intonations.

In some aspects, the techniques described herein relate to a computer system that dynamically modifies intonations in a first audio waveform to match intonations that are detected in a second audio waveform, said computer system including: a processor system; and a storage system including instructions that are executable by the processor system to cause the computer system to: access a first audio waveform; access a second audio waveform; identify a first intonation embodied within the first audio waveform, the first intonation being associated with a unit of pronunciation included in the first audio waveform; identify a second intonation embodied within the second waveform, wherein the second intonation is associated with the same unit of pronunciation, which is also included in the second audio waveform; and modify the first audio waveform by modifying the first intonation of the first audio waveform until the first intonation matches, in accordance with a pre-defined tolerance, the second intonation from the second audio waveform.

In some aspects, the techniques described herein relate to a method for dynamically modifying intonations in a first audio waveform to match intonations that are detected in a second audio waveform, said method including: accessing a first audio waveform; accessing a second audio waveform; identifying a first intonation embodied within the first audio waveform, the first intonation being associated with a unit of pronunciation included in the first audio waveform; identifying a second intonation embodied within the second waveform, wherein the second intonation is associated with the same unit of pronunciation, which is also included in the second audio waveform; and modifying the first audio waveform by modifying the first intonation of the first audio waveform until the first intonation matches, in accordance with a pre-defined tolerance, the second intonation from the second audio waveform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
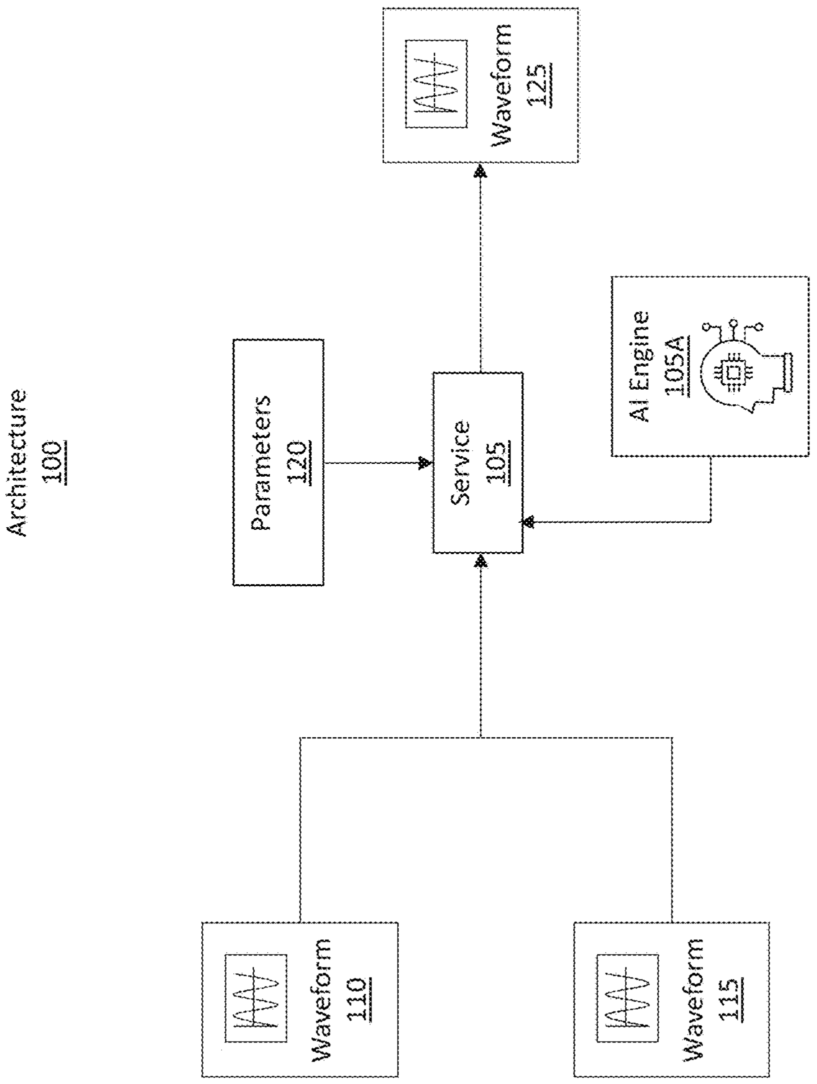
FIG. 1 illustrates an example architecture that can match the intonations from one audio waveform with the intonations from a different audio waveform.

Audio editing can be used with a voice generator. A voice generator enables text to be converted into a natural-sounding audio signal, where that signal sounds like a person's voice. In some cases, artificial intelligence (AI) can be used to generate and edit the audio signal. Although there are some existing methodologies for using text-to-speech and for editing that speech signal, there are still numerous ways for improving those processes.

For example, it is generally desirable to be able to cast and direct a voice to produce a digital recording that can be used for various productions (e.g., TV, Radio, Internet, phone prompts, etc.). Traditionally, this would mean bringing in voice talent to a professional studio and recording the desired content, generally with an audio engineer. An example might be a voice-over for a commercial or the voice for an animated film. Directors work with the talent to produce the desired outcome, helping direct the talent to inject emotions, inflections, and other desired vocal elements.

Human talent is expensive and sometimes difficult to use in a specific location for a long period of time. Additionally, there are challenges, such as working for days, only to realize the creative team is changing direction or that the voice is not providing the desired outcome. As a result, it might become warranted to reproduce all of the work while trying another vocal talent.

Since the Covid-19 pandemic, many more individuals who provide voice-over ("VO") talent have built home studios and have recorded most of their sessions there, rather than having to go into a professional commercial VO studio. In some cases, VO talent self-record a few different takes without the client on the line, and the client later chooses whichever take is best. It is often also the case that VO talent connect remotely (relative to a home studio) with an engineer and the client. Some VO talent may desire to go into professional studios because they do not have their own home setups. In all of these examples, there are costs, coordination difficulties, and connectivity challenges.

With the proliferation of computer-generated voices, such as "text-to-speech" technologies, it has become possible to direct a synthetic voice to perform many tasks that once required a human voice. However, this has mostly been used for situations where it is acceptable to the listener that the voice is recognizable as synthetic, such as with voice prompts in an automated phone system, e-learning, and news articles converted to audio, to name a few.

More recently, it has been possible to train neural algorithms to produce a more authentic and higher quality human-sounding voice. In some cases, the concept of "deep fakes" are being created, and these deep fakes sound almost identical to a specific human's voice. It is now a foregone conclusion that synthetic voice technologies will become so good that they can be used in any production product, from movies to dynamic conversational artificial intelligence (AI) systems.

While it is now possible to use newer voice technologies to convert text into a very human-like voice, most of those voices lack emotion, inflection, or an easy way to direct the output. The global community has come together to create an XML-based markup language that enables the marking up of text to provide hints that help control and direct the synthetic voice in the form of speech synthesis markup language ("SSML"). This technique, however, is very difficult to use as it ranges from simple markups, such as "pause for X milliseconds," to complex markups, such as "use this waveform to inform volume and pitch." Assistive technologies are being built to help provide user interfaces (UIs) to mitigate these complexities, but they are becoming overly complex and are likely never to provide full creative control over the voice.

The disclosed embodiments bring about numerous benefits, improvements, and practical applications to the technical field of audio signal modification to improve the issues with respect to the traditional technology. In particular, the embodiments are beneficially able to modify a text-to-speech generated audio signal/waveform in a manner so that the signal more closely approximates or matches a human-produced audio recording.

One issue with text-to-speech signals is that the resulting waveform often sounds robotic or highly synthetic. The disclosed embodiments fix this issue by enabling the modification of the intonations in a waveform in a manner so that the intonations match a human's actual intonations. In doing so, a more lifelike audio signal can be generated.

By following the disclosed principles, an untrained user (i.e. a person who is not a sound engineer) can now create professional-sounding audio signals without advanced knowledge in audio signal editing. The disclosed embodiments can employ an artificial intelligence ("AI") based platform that allows users to leverage different voices and voice characteristics to deliver a new sound waveform.

Stated differently, the disclosed embodiments provide an improved technique for generating and editing audio signals. Some embodiments focus on matching intonations in a text-to-speech generated signal to those in a human-produced audio signal. The embodiments can optionally employ an AI engine to analyze and identify the intonations that are present in both signals, which are often based on the same source text or the same unit of pronunciation (e.g., a syllable).

By modifying the intonations in the text-to-speech generated signal/waveform to match those in the human-produced signal, a more natural-sounding and lifelike audio output is achieved. The embodiments offer various techniques for modifying intonations, including frequency domain adjustments, markup language, and artificial intelligence. The embodiments can be applied to perform pre-processing operations, real-time operations, and post-processing operations for audio editing, thereby enabling users to create professional-sounding audio signals with minimal knowledge of audio signal editing.

Example Architecture

Attention will now be directed to FIG. 1, which illustrates an example computing architecture 100 that can be used to achieve the benefits described above. Architecture 100 is shown as including a service 105. As used herein, the term "service" refers to an automated program that is tasked with performing different actions based on input. In some cases, service 105 can be a deterministic service that operates fully given a set of inputs and without a randomization factor. In other cases, service 105 can be or can include an artificial intelligence (AI) engine 105A capable of operating even when faced with a randomization factor.

As used herein, reference to any type of artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

AI engine 105A can also include or incorporate the use of generative pre-trained transform (GPT) models. A GPT model refers to a unit of neural network models that rely on transformer architecture to produce human-like text, sound, and perhaps even imagery. To do so, the GPT model analyzes various different natural language queries and then generates predictions based on the model's understanding of the language. Thus, as used herein, reference to any type of AI should be viewed as including any type of machine learning (ML) algorithm and/or any type of GPT model.

In some implementations, service 105 is a cloud service operating in a cloud environment. In some implementations, service 105 is a local service operating on a local machine, such as perhaps on a laptop, tablet, smartphone, wearable device (e.g., virtual reality or augmented reality device), or any other smart device. In yet other implementations, service 105 is a hybrid service that includes a cloud component and a local component, both of which can communicate with one another.

Service 105 is able to receive various different types of inputs, such as waveform 110, waveform 115, and parameters 120. Regarding the parameters, the parameters 120 can specify that service 105 is to operate in a pre-processing state, a real-time state, or a post-processing state, or any combination thereof. Further details on these states will be provided later.

Waveforms 110 and 115 are examples of audio files. Service 105 is generally tasked with modifying the intonations in one of the waveforms to match the intonations detected in the other waveform. For instance, consider the scenario presented in FIG. 2.

Figure 2:
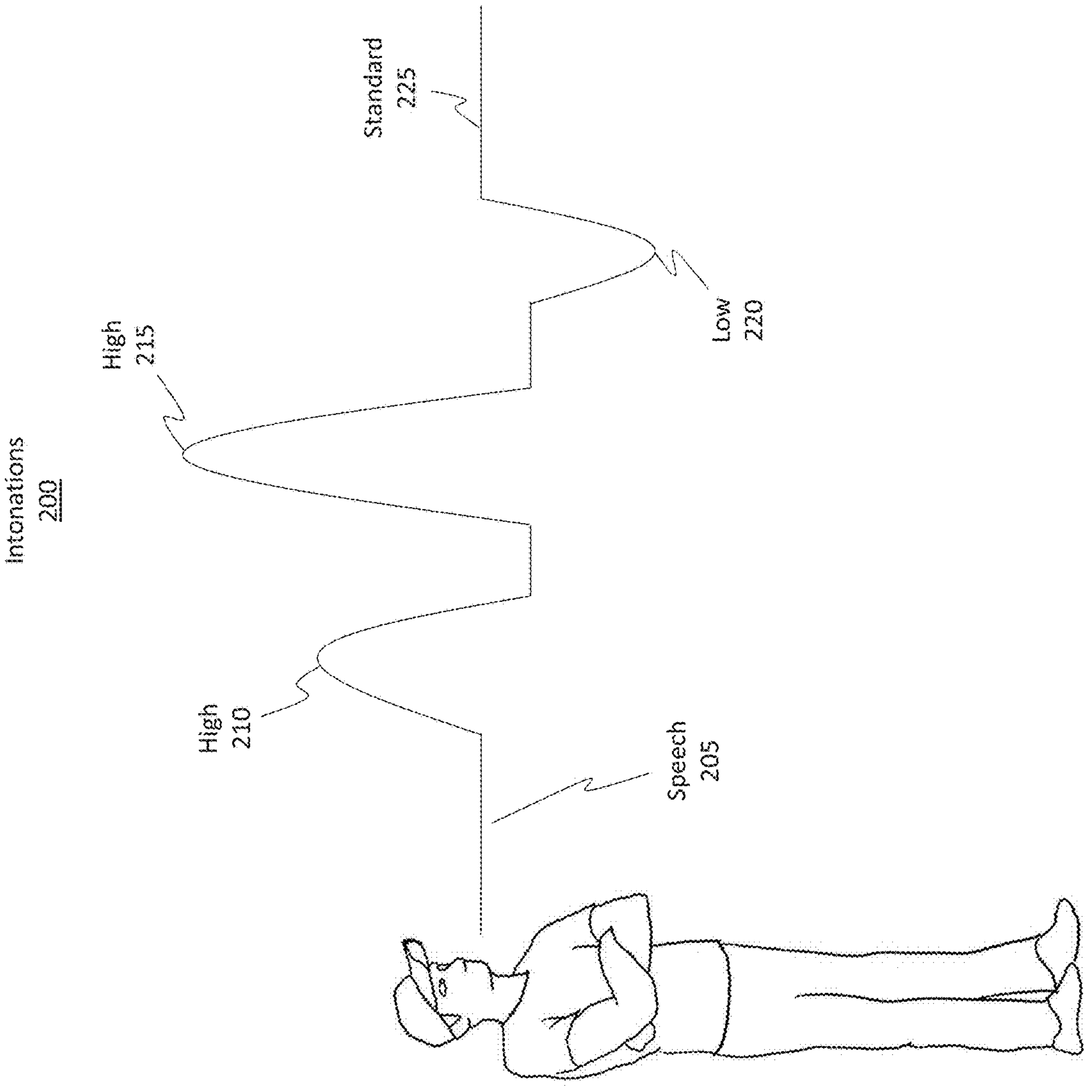
FIG. 2 illustrates various examples of intonations.

FIG. 2 illustrates the intonations 200 that a human user expresses when speaking. Here, a human is speaking, as shown by speech 205. If this speech 205 were to be processed (e.g., in the frequency domain), one can observe how speech 205 has different intonations, such as the high 210 intonation, the high 215 intonation, the low 220 intonation, and the standard 225 intonation. When speaking, humans alter the pitch, stress, and rhythm of their speech to give additional meaning to what they are saying. In accordance with the disclosed principles, the embodiments are able to analyze an audio signal (e.g., the waveforms in FIG. 1) to detect the intonations that are present within that waveform. Text-to-speech generators often produce audio waveforms that sound synthetic or robotic because those generators do not know how to accurately mimic real human speech, particularly with respect to intonations. The disclosed embodiments are able to dynamically modify the intonations in one waveform (e.g., perhaps one that was created by a text-to-speech generator) to match the intonations in another waveform (e.g., perhaps one that records a real human's speech and speech patterns, including intonations). Doing so beneficially transforms the robotic-like sound produced by a text-to-speech generator into a waveform that sounds more natural and more human-like.

Returning to FIG. 1, in some embodiments, service 105 is configured to (i) generate SSML automatically, (ii) allow further refinement of a waveform, and/or (iii) modify a resulting waveform directly and/or using whatever application programming interfaces (APIs), UIs, or others interfaces are available to directly control a computer-generated voice.

Some embodiments are configured to train an AI engine, which may include a neural network, GPT model, or any other type of ML model, to enable a user to record the same content as what a synthetic voice is being asked to produce. The human can pause, add inflections, and/or perform nearly an infinite number of other emotional acts while being recorded. A neural network extracts a delta from (i) a baseline synthetic output (e.g., a waveform generated by a text-to-speech generator) and (ii) the human recorded waveform to thereby generate SSML. When this SSML is subsequently applied to the synthetic voice, service 105 can attempt to make the synthetic voice sound as similar to the human-recorded output as possible. To clarify, the voice may not sound the same, but the manner of speaking is mimicked (e.g., the intonations, volume, pauses, emotion, and so on).

Another feature of the disclosed embodiments relates to the ability to access the human-recorded waveform and to modify the output waveform from the synthetic voice (i.e. the output from the text-to-speech generator) to again match. A UI can be used to direct the disclosed operations, thereby allowing the SSML/API of a voice to be generated, while also using the waveform modifications at the same time. The UI helps the user to achieve the desired outcome.

In FIG. 1, service 105 is tasked with receiving or otherwise accessing a first waveform 110, a second waveform 115, and any additional parameters 120 (e.g., perform pre-processing, real-time processing, and/or post-processing). Service 105 provides an interface to allow a user to directly manipulate multiple voices at the same time and to control various aspects of a voice, such as volume, rate, pitch, and breaks. In some cases, service 105 performs an initial modification, and the user can then review and fine-tune those adjustments. In some scenarios, the user may not be involved at all with the modifications. Regardless, the interface is designed to allow the user to record his/her own voice and to use that to direct the manipulations.

In some cases, the first waveform 110 is representative of a waveform that is produced from a text-to-speech generator. The second waveform 115 is representative of an audio recording of a human who is speaking. Both waveforms are based on the same underlying set of information, or rather, the same body of words or the same source of text. For example, the first waveform 110 may be generated by converting a block of words from text to speech using the text-to-speech generator. The block of words can be any length, such as any number of words, sentences, or paragraphs, without limit. In some cases, the number of words may be as few as between 1-100 words while in other cases the number of words can exceed multiple hundreds of words. The second waveform 115 is generated by recording a human reading out loud that same block of words.

For instance, the following text can be fed as input to a text-to-speech generator: "Hello, my name is Jeremy!" "Very nice to meet you today!" The text-to-speech generator generates an audio waveform based on that text. A human can record him/herself reading the same body of text, thereby creating a second audio waveform. These two waveforms correspond to one another because they are based on the same underlying body of text. The voices might sound different as between the two waveforms, but the intonations in the first waveform can be modified to match the intonations found in the second waveform, thereby transforming the sound effects of the first waveform into a more natural sounding audio file (i.e. one that matches the human-produced waveform).

In some implementations, service 105 operates as a pre-processing engine. For instance, service 105 receives the waveforms and then performs various operations to modify the sound signals. In other implementations, service 105 performs these modifications in real-time. In some implementations, post-processing is performed by service 105. Further details on these aspects will be provided shortly.

In any event, service 105 receives waveforms 110 and 115. Service 105 analyzes the intonations that are present in those waveforms. Service 105 then modifies the intonations in the first waveform 110 to match (e.g., at least within an acceptable threshold) the intonations that are present in the second waveform 115. As a result, waveform 125 is generated. The acceptable threshold can be set to any value. Often, the level of acceptable difference between the two waveforms is between about 0% and 5%. What this means is that the first waveform is modified so it matches the second waveform at a match level of between about 95% and 100%. Of course, other threshold values can also be used.

In the pre-processing stage, service 105 receives both waveforms 110 and 115. Service 105 then analyzes the intonations that are present in the first waveform 110 and the intonations that are present in the second waveform 115. Here, the second waveform 115 is considered to be the baseline "truth." Service 105 then modifies the intonations in the first waveform 110 to match (e.g., at least within an acceptable threshold) the intonations that are present in the second waveform 115.

Matching the intonations can be performed on a word-by-word or on a "unit of pronunciation" (e.g., syllable or perhaps word) basis. That is, each word or syllable (for brevity, only one term will be used from here on, but the principles apply to both) will have its own set of one or more intonations. Service 105 is able to modify each word's intonations in the first waveform 110 to match each corresponding word's intonations in the second waveform 115. Waveform 125 is generated as a result of service 105's operations. In some cases, waveform 125 is a modified version of waveform 110. In some cases, waveform 125 is a new copy that is distinct from waveform 110.

Different techniques can be used to modify the intonations of the first waveform 110. For example, in one scenario, service 105 can convert waveform 110 to the frequency domain and then modify the frequency characteristics of the first waveform 110 to match the frequency characteristics of the second waveform 115, which is also converted to the frequency domain. Service 105 is able to identify differentials in intonation and then modify one signal to eliminate the differentials. Metrics can be visually displayed to indicate the level of differentials.

Another modification technique includes using a markup language to mark up the source text (e.g., the block of words mentioned earlier) in a manner so that the text-to-speech generator is subsequently caused to read the words, which now includes programmatically altered language, where that language is designed to match the human's language. Thus, in some cases, the speech-to-text generator produces a first waveform based on a first version of text. The embodiments then modify the text to create a second version of text (e.g., reflecting how the text is to be subsequently read). The text-to-speech generator is then caused to produce a second waveform based on the second version of the text.

As an example, markup language (e.g., tags) can be provided within a sentence/text to place an emphasis on a particular word or syllable within a word. When the text-to-speech generator reads the words, the generator will also detect the markup language and read the words in accordance with the markup language. Thus, service 105 is able to programmatically insert markup language into the text at various locations in order to modify the intonations that are used by the text-to-speech generator.

Another technique involves machine learning, where the AI engine 105A is trained on intonations. The AI engine 105A can then adjust the waveform based on its training.

In some cases, the human-produced waveform (i.e. waveform 115) is generated first. Service 105 then detects the intonations within that waveform. Service 105 can perform text-to-speech operations and apply the learned intonations from waveform 115 to generate a new waveform having intonations that match waveform 115. The waveforms can also be generated concurrently or asynchronously relative to one another.

Service 105 is also able to perform real-time processing or operate in a real-time processing stage. For instance, a person may be speaking, and a voice-to-text generator may generate a transcript of the speech. That transcript can then be provided to a text-to-speech generator. Service 105 may then perform the operations described above using the output of the text-to-speech generator. In this sense, service 105 can be viewed as operating in real-time to not only capture a speaker's words but also to generate and modify a waveform having intonations that match a different waveform source.

In some implementations, waveform 115 may have been previously saved and may include the intonations of interest. Service 105 can receive or otherwise access waveforms 110 and 115 and then perform various operations to generate waveform 125, which includes intonations that match those of waveform 115.

In some implementations, AI can be use to learn intonations from a corpus of stored human recordings. The AI can then apply its learnings to a new waveform, such as one generated by a text-to-speech generator.

Service 105 is also able to operate in or facilitate a post-processing stage. For instance, waveform 125 can be fed as input into an audio editing engine. Various additional modifications to the waveform 125 can be performed using the audio editing engine. Such modifications include changes to the waveform's volume, pitch, and break.

Accordingly, some embodiments employ a pre-processing operation, stage, or phase in which service 105 can dynamically modify a waveform's intonations to match the intonations of another waveform. Some embodiments employ real-time processing in which service 105 can record speech, generate a transcript of that speech, use the transcript to generate an audio file, and then modify the intonations in that audio file to match the intonations in another audio file. Some embodiments additionally employ a post-processing operation in which the waveform can be further modified.

Figure 3:
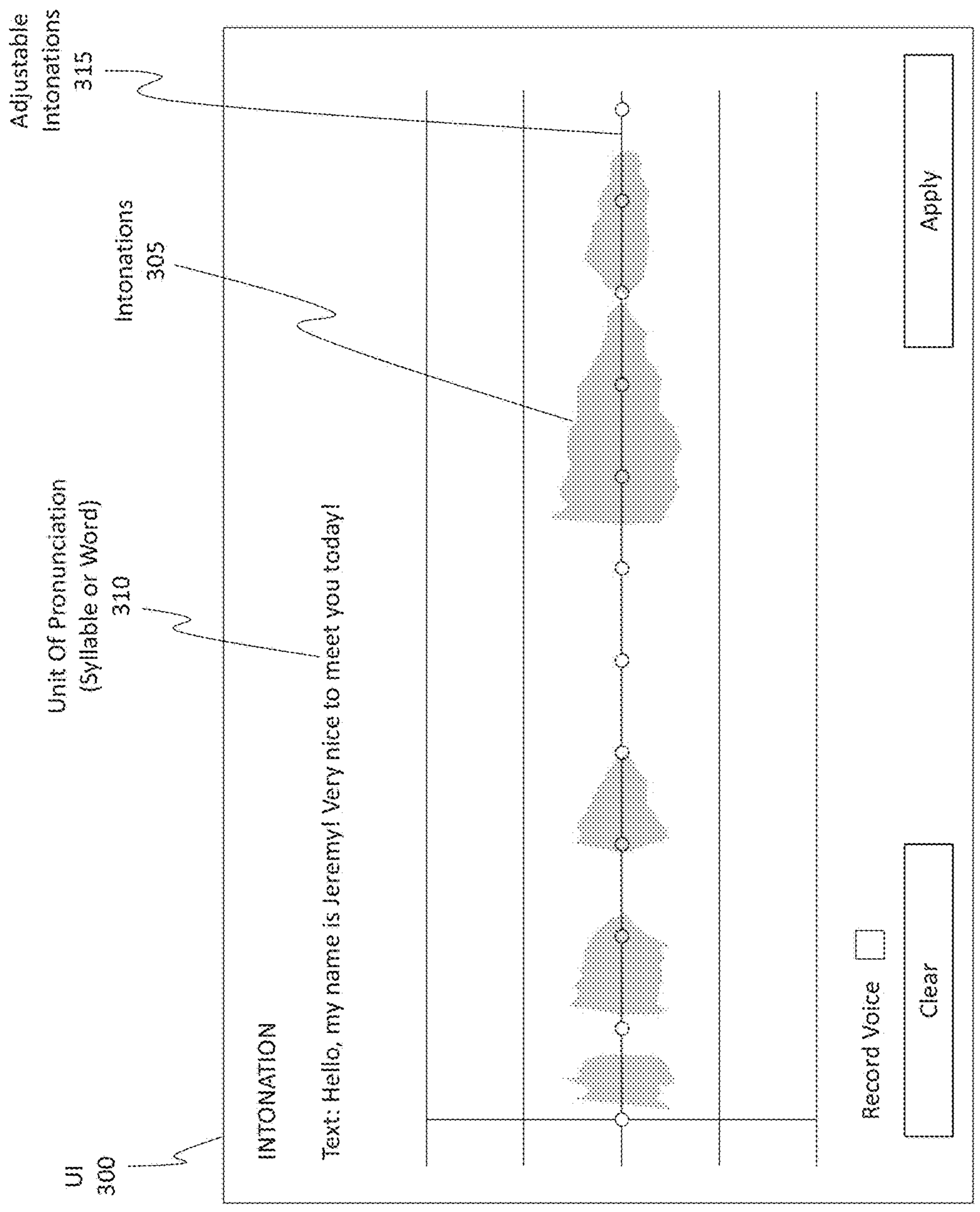
FIG. 3 illustrates an example user interface displaying an audio waveform.

FIG. 3 shows an example user interface (UI) 300 showing various detected intonations 305 for a sound recording. Here, a text-to-speech generator has generated a waveform based on the following sentences: "Hello, my name is Jeremy!" "Very nice to meet you today!"

UI 300 shows the sound waves of the resulting voice, including the intonations 305. To clarify, UI 300 shows the sound wave for the following text (when spoken): "Hello, my name is Jeremy!" "Very nice to meet you today." That text includes various different units of pronunciation (e.g., syllables or words). That is, a unit of pronunciation can include a single syllable or a group of syllables forming a word. For instance, the word "meet" is labeled as one such unit of pronunciation (syllable or word) 310.

UI 300 also shows an adjustable intonations 315 option or tool (e.g., the line with circles; it is currently flat). Some embodiments are configured to allow a user and/or service 105 to select specific portions of text and to then modify the corresponding volume, pitch, breaks, intonation, and rate for the selected text. For instance, the word "Hello" can be selected. The portion of the waveform that corresponds to that word can be highlighted, bolded, or otherwise emphasized or selected in some manner. Service 105 or the user can then easily identify which intonations are associated with that word. Those intonations can then be modified using the adjustable intonations 315 option.

By way of further clarification, UI 300 allows the user to see whatever text has been selected and to display an audio waveform for that text when read aloud. In some implementations, UI 300 can be configured to show how each word corresponds to an area of the waveform. Users can then record their own voices saying the same text but with any intonation the users so desire. When a user's recording is complete, the embodiments will then attempt to extract the emotion (e.g., volume, pitch, intonations, etc.) from the user's recording and apply that to the synthesized voice.

For instance, the embodiments can extract and provide input to the synthesized voice, such as SSML markup and/or transformation functions that would modify the synthetic voice waveform to match the recorded one, including the exact break length, speed, and word inflections.

Another example scenario is where the user has hired a human to produce the desired audio. Later, the human may no longer be available, or, alternatively, it may not be desirable to bring that human back in to fix something that was recorded. For example, perhaps the text was incorrectly read, perhaps there was an error in the script, or perhaps specific words warrant modification in their inflections. The embodiments can automatically select a closely matching neural voice, attempt to retrain it to match the original voice, and then provide the editor with the resulting waveform.

From this disclosure, one can appreciate how anything from a single word to an entire text section can be reproduced. In some cases, various modifications can be implemented to remove just what is being changed from the original recordings and to replace it with new, synthetic "fixes" that attempt to modify the transitions, voice, and cadence such that it is essentially impossible to know whether a modified version is or is not an original recording based on simply listening to the waveform. The embodiments are able to match text to specific portions of a recording, either automatically using speech-to-text or text-to-speech technologies or with an included text file that is synchronized to the recordings.

Figure 4:
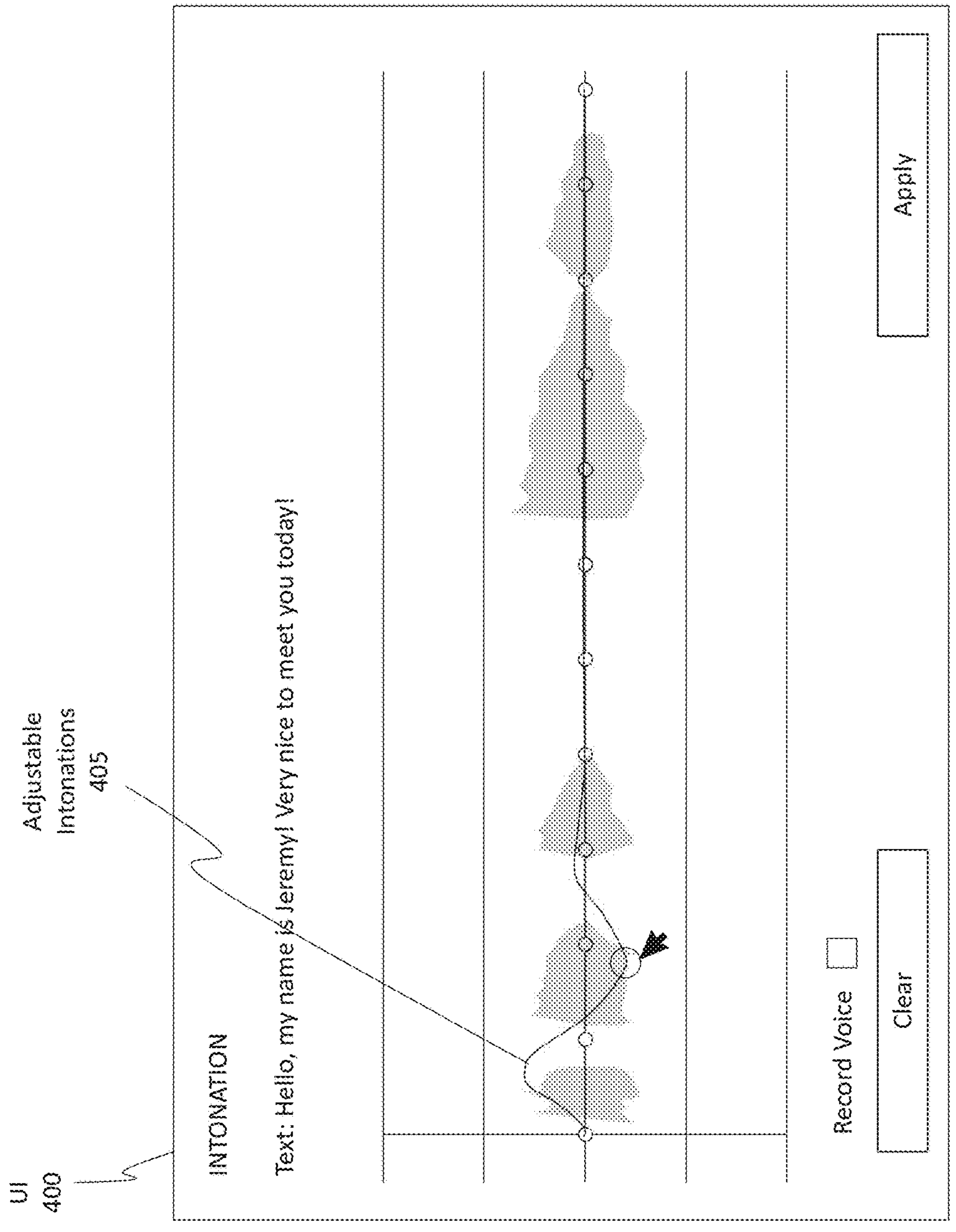
FIG. 4 illustrates an example interface where intonations are being modified.

FIG. 4 illustrates an example UI 400 showing how the intonation settings can be modified via use of the adjustable intonations 405 option. For instance, the beginning of the spoken sentence has been given a high intonation followed by low intonations.

Figure 5:
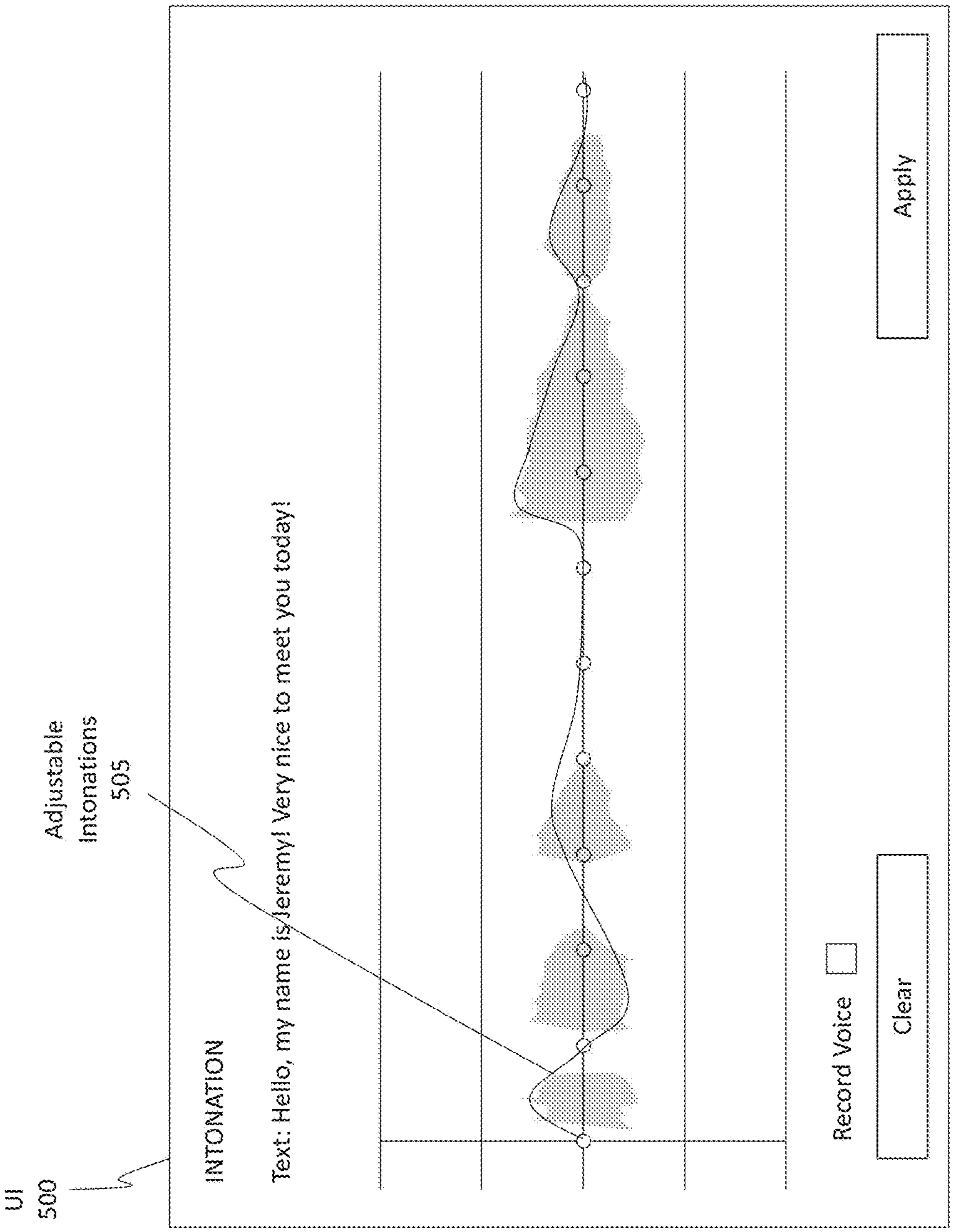
FIG. 5 illustrates another example interface where intonations are being modified.

FIG. 5 illustrates an example UI 500 showing how other intonation portions have also been modified via use of the adjustable intonations 505 option. A user and/or the service can identify the intonations that are present in a waveform. Additionally, the user (e.g., via the UI) or the service can dynamically modify the intonations to match those of another waveform, as shown in FIG. 6A.

Figure 6A:
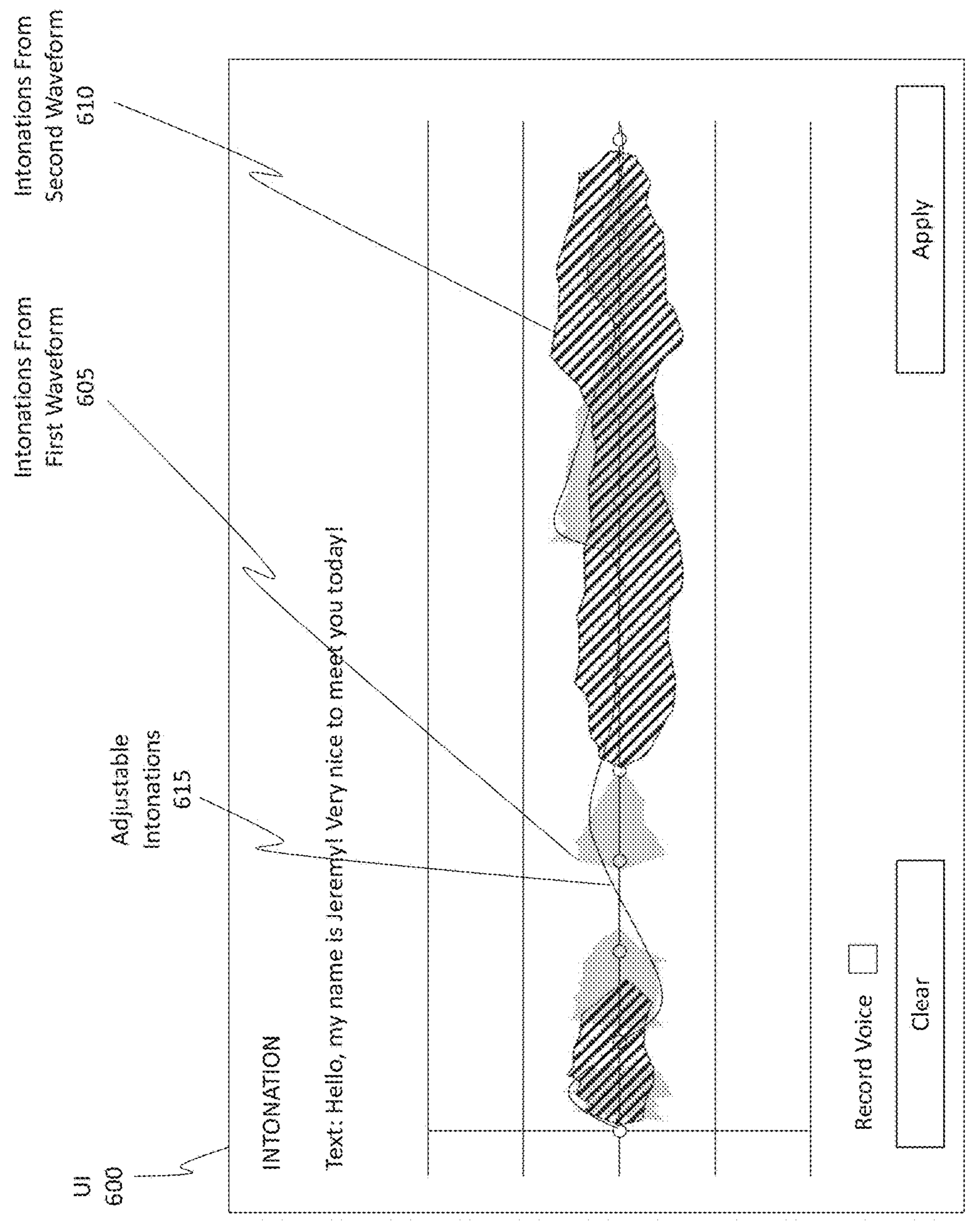
FIG. 6A illustrates how the intonations from one waveform can be matched to the intonations of another waveform.

FIG. 6A shows an example UI 600 that includes two different waveforms, or rather the intonations from two different waveforms. To illustrate, FIG. 6A shows intonations from the first waveform 605 and intonations from the second waveform 610. The intonations from the first waveform 605 may correspond to intonations detected within waveform 110 of FIG. 1. Similarly, the intonations from the second waveform 610 may correspond to the intonations detected within waveform 115. UI 600 also includes the adjustable intonations 615 option.

Using the adjustable intonations 615 option, a user or service can modify the intonations from the first waveform 605 to align, match, or correspond to the intonations from the second waveform 610. This alignment can be within a predetermined threshold level, such as perhaps by allowing a 0-5% deviation or buffer between the two intonation signals. Of course, other deviation ranges or thresholds can be used as well.

Figure 6B:
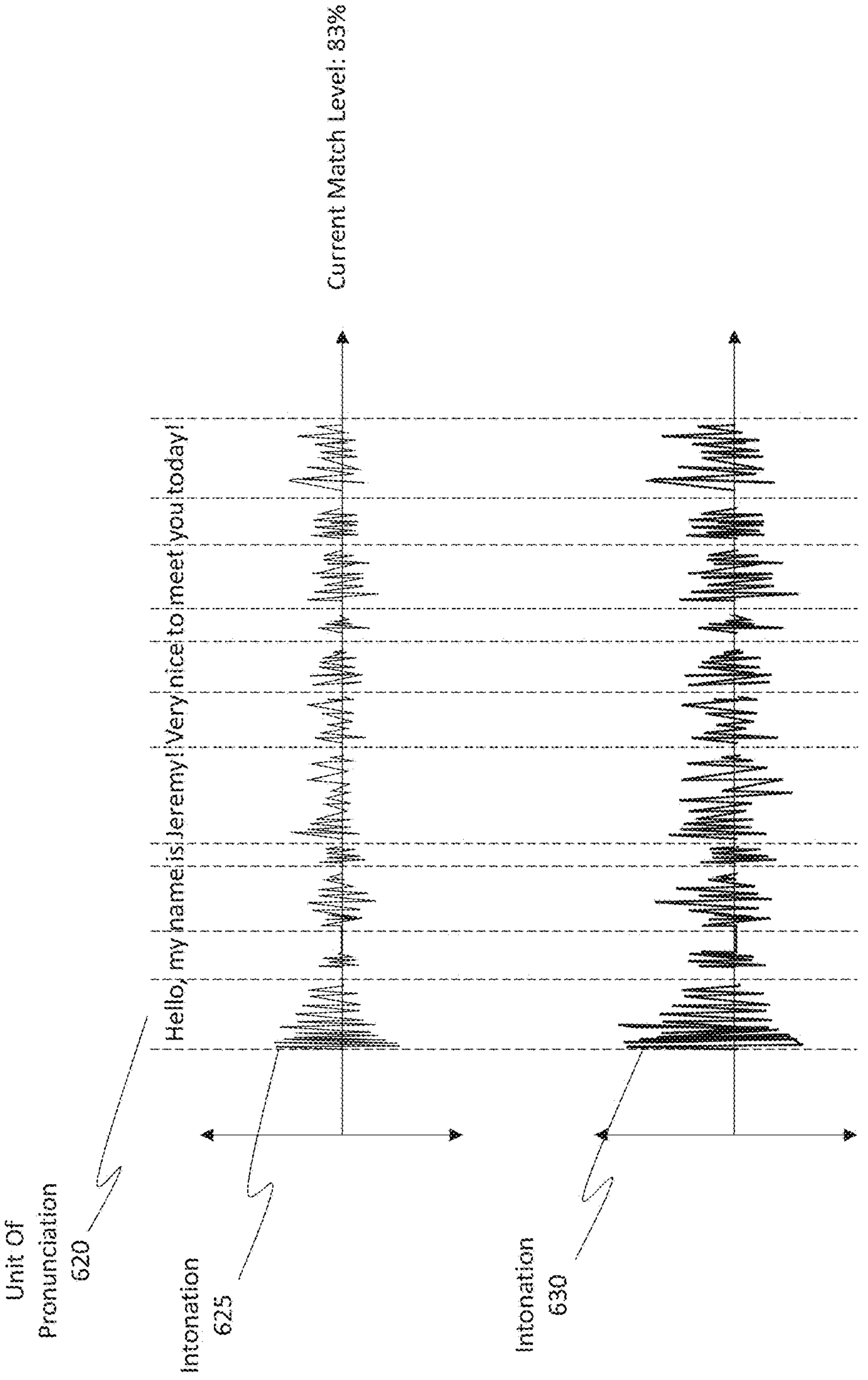
FIG. 6B illustrates a comparison between different intonations for the same units of pronunciation.

FIG. 6B provides a different visualization. FIG. 6B shows the following source of text: "Hello, my name is Jeremy!" "Very nice to meet you today!" This source of text includes multiple units of pronunciation, one of which is labeled as unit of pronunciation 620. For each unit of pronunciation, FIG. 6B shows a corresponding intonation from the first waveform and from the second waveform. For instance, intonation 625 is the intonation for the word "Hello," which is labeled as the unit of pronunciation 620. Intonation 625 is included in the first audio waveform 110. Similarly, intonation 630 is for the same unit of pronunciation 620 and is from the second audio waveform 115. The disclosed embodiments are able to modify the intonation 625 to match, to at least within a threshold level (e.g., often anywhere between 0-5% difference), the intonation 630. The embodiments can display a metric to reflect the level of match between different intonations. Such a depiction is shown in FIG. 6B with the following language: "Current Match Level: 83%." As modifications occur, the level of match can increase or decrease.

Figure 7:
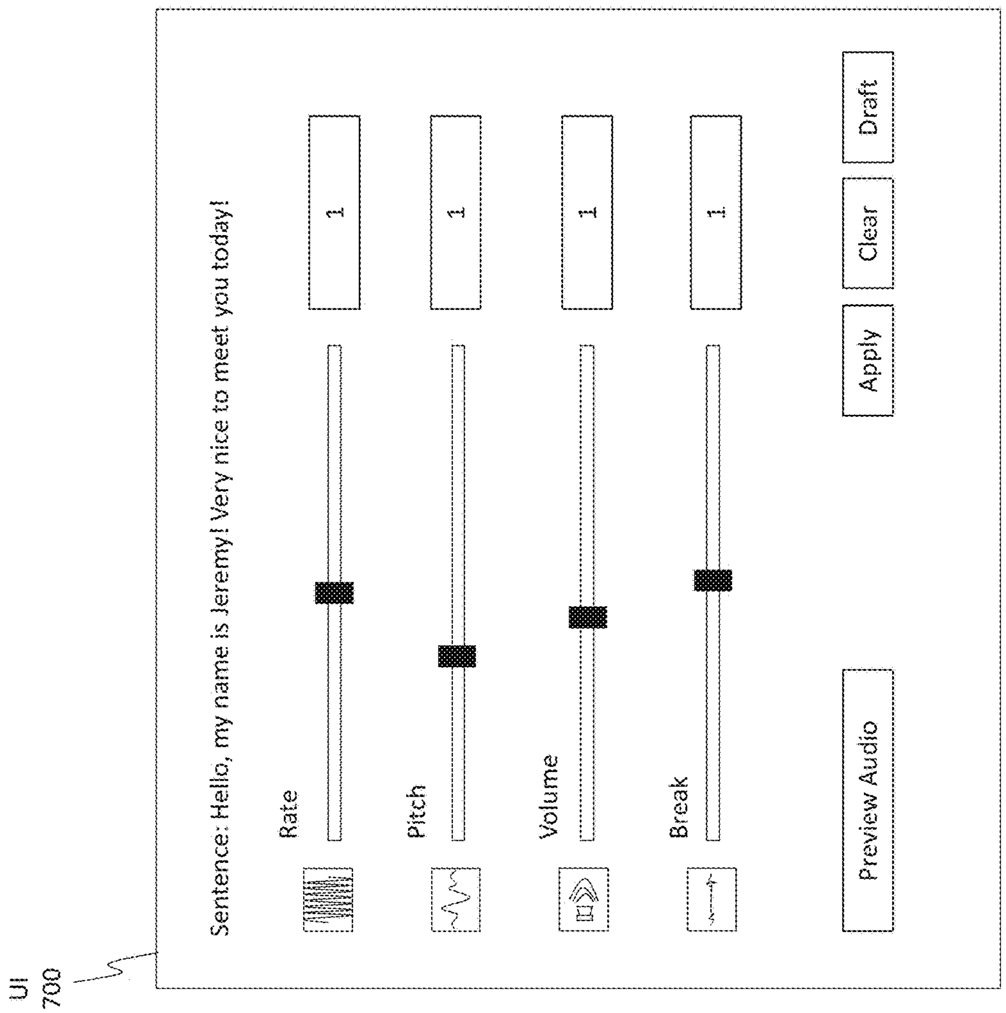
FIG. 7 illustrates various other audio characteristics that can be modified.

FIG. 7 shows an example UI 700 that provides some various other tools or audio editing options, such as rate modification, pitch modification, volume modification, and break modification. These tools can also be used by the user and/or service to modify a waveform.

Accordingly, the disclosed embodiments are able to automatically (or enable manual modification) modify the intonations in one waveform to match the intonations that are detected in another waveform.

Trained Avatar

The disclosed service is able to generate a new waveform having intonations that match another waveform. Consequently, the service can be viewed as generating a type of avatar or avatar speech that has tunable speech characteristics. The avatar voice can thus be trained to sound like a real person. In addition to this human-like speech characteristic, the avatar can also be trained to comprehend the context of the text being read and to adjust its intonations accordingly.

By way of example, the disclosed service can also have, use, or otherwise rely on a natural language processing (NLP) engine, which may be included as a part of the AI engine 105A from FIG. 1. This NLP engine can analyze unstructured text, which may include sentiment data. For instance, the following statement is one example of unstructured text having sentiment: "I absolutely hate this product." This statement has no qualitative value currently associated with it. Unstructured text can thus be thought of as text that has no qualitative value.

In contrast, structured language has a qualitative aspect associated with it, such as a grade (e.g., A, B, C, D, or F), rating value (e.g., 100% satisfaction, 50% satisfaction, etc.), or some other value (e.g., a 5-star rating). NLP engine is able to analyze the unstructured text, detect the sentiment, and then assign a qualitative sentiment value to the unstructured text. For instance, regarding the phrase "I absolutely hate this product," NLP engine may determine that this sentiment is strongly negative and thus assign the following qualitative value to the phrase: 0 out of 10 rating.

With the sentiment and qualitative value determined, the service can then generate intonations that reflect or correspond to the value. In some instances, pre-stored recordings may be available that reflect different levels of sentiment. For instance, an angry or upset sentiment may have a recording stored, and the intonations from that recording can be determined. Those intonations may then optionally be applied to the current waveform. In this regard, the embodiments are able to comprehend the context of whatever text is currently being analyzed and then apply corresponding intonations.

In some cases, the embodiments can evaluate the output and then suggest alternative intonations for specific segments. The original voice can then be altered to match these new intonations, either from the voice itself or through external markup or prompting. In some cases, modifications to intonations can be performed using natural language input in addition to or as an alternative to specialized markup methods.

Regarding an avatar's voice being trained to sound like a real person and to comprehend the context of the text being read, the embodiments can also facilitate various context-aware intonation adjustment processes. That is, the embodiments are able to analyze the content and adjust the intonations based on the context. Regarding the ability to suggest alternative intonations, the embodiments include a UI or an API that enables interaction between the service and a reviewer. Thus, the embodiments can receive suggestions for alternative intonations and then implement them in the output.

Regarding modifications to intonations using natural language input and not just specialized markup methods, the embodiments can rely on the use of NLP techniques for adjusting intonations. Thus, the embodiments are able to understand and modify intonations based on language cues without relying solely on markup methods.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
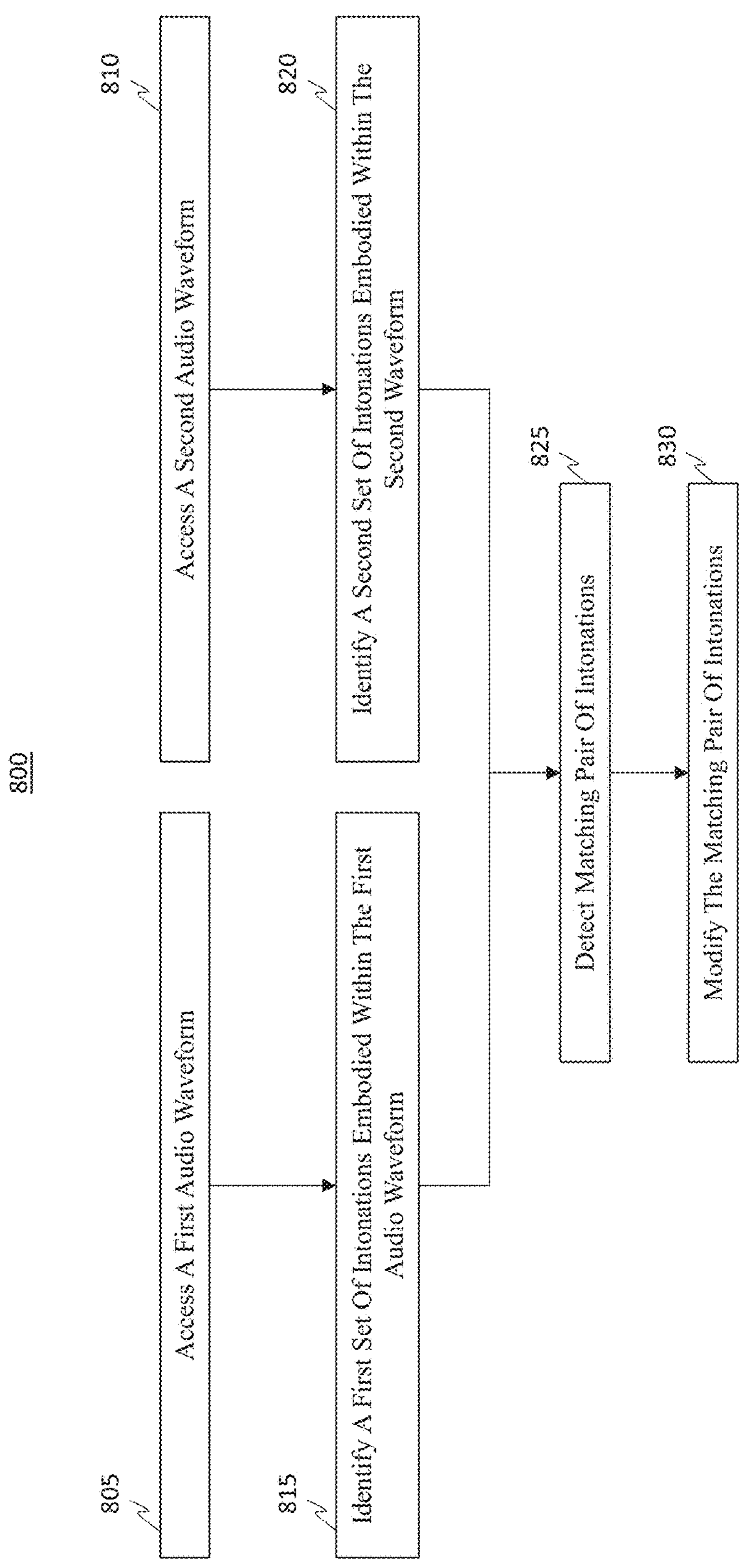
FIG. 8 illustrates a flowchart of an example method for dynamically modifying the intonations embodied in one waveform to match the intonations embodied in another waveform.

Attention will now be directed to FIG. 8, which illustrates a flowchart of an example method 800 for dynamically modifying intonations in a first audio waveform to match intonations that are detected in a second audio waveform. Method 800 can be implemented by service 105 of FIG. 1. As mentioned, service 105 can include one or more of a machine learning engine or a generative pre-trained model.

Method 800 includes an act (act 805) of accessing a first audio waveform representing output from a text-to-speech generator operating on a source of text. The waveform 110 of FIG. 1 can be representative of this first audio waveform.

In some scenarios, the source of text is generated as a result of a particular audio waveform (e.g., perhaps a real-time sound recording) being fed as input to a speech-to-text generator, which then generates the text from that particular audio waveform. Stated differently, in some cases, the source of text is generated by a speech-to-text generator.

In parallel or in serial with act 805, act 810 includes accessing a second audio waveform representing a recording of a human reading the same source of text. Waveform 115 of FIG. 1 can be representative of this second audio waveform.

Act 815 includes identifying a first set of intonations embodied within the first audio waveform. The first set of intonations are enunciated for syllables within the source of text. Stated differently, the syllables are pronounced when the source of text is read by the text-to-speech generator.

In parallel or in serial with act 815, act 820 includes identifying a second set of intonations embodied within the second waveform. The second set of intonations are enunciated for the same syllables, which were pronounced when the source of text was read by the human.

For each respective syllable, act 825 includes detecting a corresponding matching pair of intonations. Notably, the corresponding matching pair of intonations includes an intonation from the first set of intonations for each respective syllable and an intonation from the second set of intonations for each respective syllable.

For each respective syllable, act 830 includes modifying each syllable's corresponding matching pair of intonations by causing that matching pair's intonation from the first set of intonations to match, within a predefined threshold, that matching pair's intonation from the second set of intonations. In some implementations, the process of modifying includes modifying one or more of a rate characteristic for the waveform, a pitch characteristic for the waveform, a volume characteristic for the waveform, and/or a break characteristic for the waveform.

In some embodiments, the method further includes an act of converting the first and/or second waveform to a frequency domain. While in this domain, the embodiments can then modify the frequency characteristics of the first and/or second waveform.

Optionally, the method can include an act of using a markup language to mark up the source of text. As a result of marking up the source of text, a text-to-speech generator can then be used to read the source of text, which now includes programmatically altered language, thereby creating a new waveform. In other scenarios, a copy of the first waveform is created and modified. In yet other scenarios, the original version of the first waveform is modified.

Accordingly, the disclosed embodiments are able to modify the intonations that are present in one audio waveform to match the intonations that are present in a second audio waveform.

Figure 9:
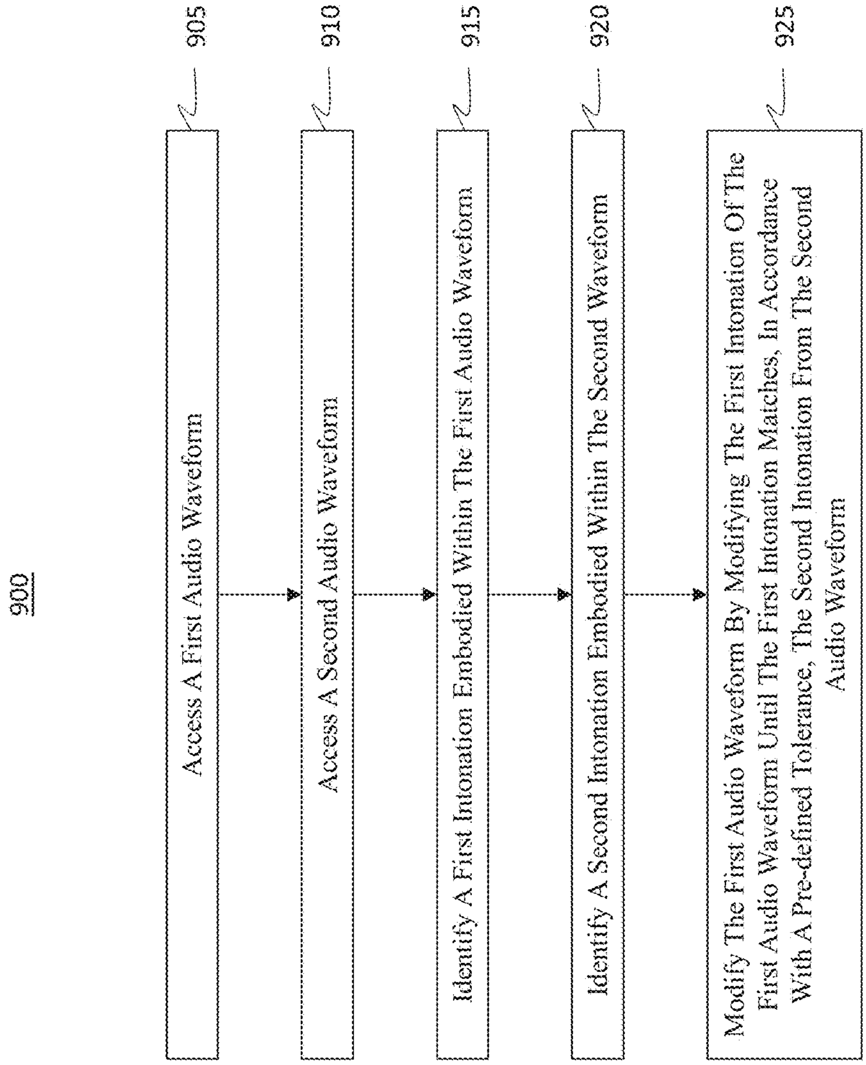
FIG. 9 illustrates another flowchart of an example method for modifying intonations.

FIG. 9 illustrates another flowchart of an example method 900 for dynamically modifying intonations in a first audio waveform to match intonations that are detected in a second audio waveform. Method 900 can also be implemented by service 105 of FIG. 1.

Method 900 includes an act (act 905) of accessing a first audio waveform. Waveform 110 of FIG. 1 is representative.

Act 910 includes accessing a second audio waveform. Waveform 115 is representative.

Act 915 includes identifying a first intonation embodied within the first audio waveform. Any one or more of the intonations 305 of FIG. 3 are representative. The first intonation is associated with a unit of pronunciation included in the first audio waveform. For instance, one of the intonations 305 corresponds to the unit of pronunciation (syllable or word) 310 in FIG. 3.

Act 920 includes identifying a second intonation embodied within the second waveform. The second intonation is associated with the same unit of pronunciation, which is also included in the second audio waveform. For example, FIG. 6B showed a scenario involving an intonation 625, which is from the first waveform, and an intonation 630, which is from the second waveform. Both of these intonations correspond to the same unit of pronunciation 620 (e.g., the word "Hello").

Act 925 includes modifying the first audio waveform by modifying the first intonation of the first audio waveform until the first intonation matches, in accordance with a pre-defined tolerance (e.g., often between about 0-5% tolerance or less than 5%, meaning that the intonations match with one another between about 95% and 100%), the second intonation from the second audio waveform. For example, FIGS. 4, 5, and 6A showed a scenario where the adjustable intonations 615 option or tool can be used to modify one intonation to match a different intonation. As another example, the adjustable intonations 615 option can be used to modify the intonation 625 from FIG. 6B to match the intonation 630. In some cases, a displayed metric can be provided to facilitate the matching or aligning process. For example, FIG. 6B shows how the embodiments can display a metric to reflect the level of match between different intonations. Such a depiction is shown in FIG. 6B with the following language: "Current Match Level: 83%."

The disclosed service can perform a pre-processing operation, a real-time operation, or a post-processing operation. In some implementations, the first audio waveform is generated in real-time. In some cases, the first audio waveform is output from a text-to-speech generator. Optionally, the second audio waveform is a pre-saved audio waveform stored in a repository of waveforms.

Some embodiments use a speech-to-text generator to generate a transcript of a human who is speaking. The embodiments then feed the transcript as input to a text-to-speech generator to generate the first audio waveform.

In some cases, the first and/or second audio waveforms correspond to a source of text that includes between 1 and 50 words. In some cases, the first and second audio waveforms correspond to a source of text that includes more than 10 words. The text can include any number of words. For instance, the text can include over 100 words, 200, 300, 400, 500, or any number over 500 words. In any event, the first waveform and the second waveform are associated with the same source of text. In some cases, it may be the case that the two waveforms are associated with different sources of text. In such scenarios, the AI engine can learn the intonation patterns from one of those waveforms and attempt to apply those same types of patterns to the other waveform.

Example Computer/Computer Systems

Figure 10:
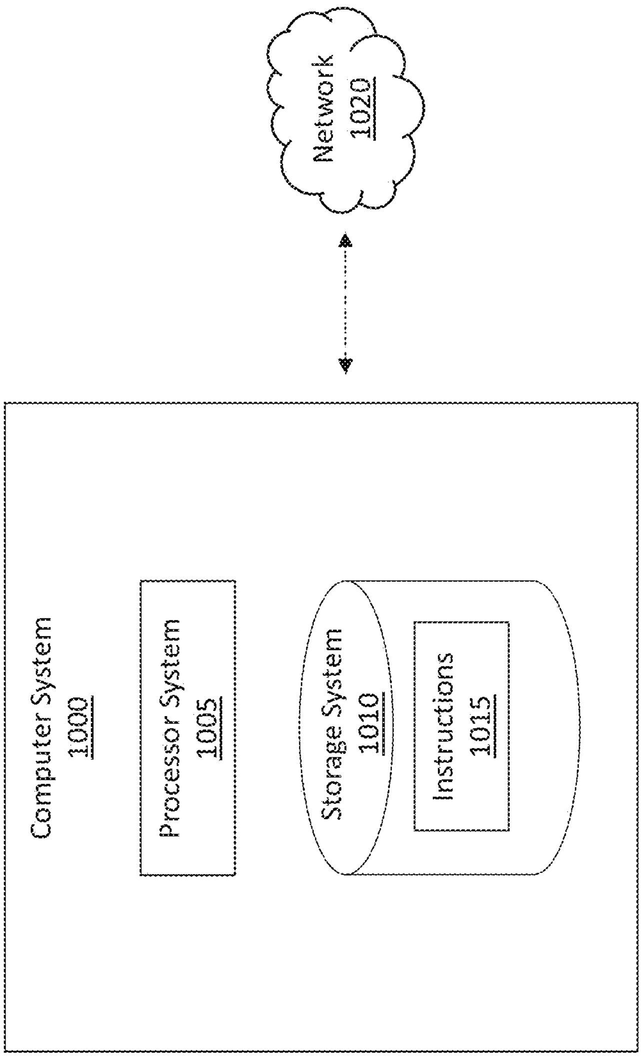
FIG. 10 illustrates an example computer system configured to perform any of the disclosed operations.

Attention will now be directed to FIG. 10 which illustrates an example computer system 1000 that may include and/or be used to perform any of the operations described herein. Computer system 1000 may take various different forms. For example, computer system 1000 may be embodied as a tablet, a desktop or a laptop, a wearable device, a mobile device, or any other standalone device. Computer system 1000 may also be a distributed system that includes one or more connected computing components/devices that are in communication with computer system 1000. Computer system 1000 can implement service 105 of FIG. 1.

In its most basic configuration, computer system 1000 includes various different components. FIG. 10 shows that computer system 1000 includes processor system 1005 and storage system 1010.

Regarding the processor system 1005, it will be appreciated that the functionality described herein can be performed, at least in part, by one or more hardware logic components (e.g., processor(s)) included in the processor system 1005. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1000. For instance, the ML engines mentioned previously can be implemented in the computer system 1000. The different components, modules, engines, and services described herein may be implemented as objects or processors that execute on computer system 1000 (e.g. as separate threads).

Storage system 1010 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage system 1010 is shown as including executable instructions 1015. The executable instructions 1015 represent instructions that are executable by the processor system 1005 of computer system 1000 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1020. For example, computer system 1000 can communicate with any number of devices or cloud services to obtain or process data. In some cases, network 1020 may itself be a cloud network. Furthermore, computer system 1000 may also be connected through one or more wired or wireless networks to remote/separate computer systems(s) that are configured to perform any of the processing described with regard to computer system 1000.

A "network," like network 1020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with network 1020. Transmission media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each performs tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically modifying intonations in a first audio waveform to match intonations that are detected in a second audio waveform, said method comprising:

accessing a first audio waveform representing output from a text-to-speech generator operating on a source of text, wherein the text-to-speech generator is configured to generate the first audio waveform based on a source of text and a set of parameters comprising a rate characteristic, a pitch characteristic, a volume characteristic, and a break characteristic;

accessing a second audio waveform representing a recording of a human reading the source of text;

identifying a first set of intonations embodied within the first audio waveform, the first set of intonations being enunciated for syllables within the source of text;

identifying a second set of intonations embodied within the second waveform, the second set of intonations being enunciated for the same syllables;

for each respective syllable in said syllables, detecting a corresponding matching pair of intonations, wherein said corresponding matching pair of intonations includes an intonation from the first set of intonations for said each respective syllable and an intonation from the second set of intonations for said each respective syllable; and for each respective syllable in said syllables, modifying, using a frequency-domain transformation or programmatically generated markup commands, said each respective syllable's corresponding matching pair of intonations by causing that matching pair's intonation from the first set of intonations to match, within a predefined threshold, that matching pair's intonation from the second set of intonations, and wherein said modifying includes adjusting one or more of the set of parameters comprising the rate characteristic, the pitch characteristic, the volume characteristic, and the break characteristic.

2. The method of claim 1, wherein the method is performed by a service.

3. The method of claim 2, wherein the service includes one or more of a machine learning engine or a generative pre-trained model.

4. The method of claim 1, wherein said modifying includes converting the first waveform to a frequency domain using the frequency-domain transformation and modifying frequency characteristics of the first waveform in the frequency domain.

5. The method of claim 1, wherein said modifying includes using the programmatically generated markup commands to mark up the source of text.

6. The method of claim 5, wherein, as a result of marking up the source of text, the text-to-speech generator is caused to read the source of text, which now includes programmatically altered language.

7. The method of claim 1, wherein the source of text is generated by a speech-to-text generator.

8. A computer system that dynamically modifies intonations in a first audio waveform to match intonations that are detected in a second audio waveform, said computer system comprising:
- a processor system; and
- a storage system comprising instructions that are executable by the processor system to cause the computer system to:
  - access a first audio waveform representing output from a text-to-speech generator operating on a source of text, wherein the text-to-speech generator is configured to generate the first audio waveform based on a source of text and a set of parameters comprising a rate characteristic, a pitch characteristic, a volume characteristic, and a break characteristic;
  - access a second audio waveform;
  - identify a first intonation embodied within the first audio waveform, the first intonation being associated with a unit of pronunciation included in the first audio waveform;
  - identify a second intonation embodied within the second waveform, wherein the second intonation is associated with the same unit of pronunciation, which is also included in the second audio waveform; and
  - modify, using a frequency-domain transformation or programmatically generated markup commands, the first audio waveform by modifying the first intonation of the first audio waveform until the first intonation matches, in accordance with a pre-defined tolerance, the second intonation from the second audio waveform, and wherein said modifying includes adjusting one or more of the set of parameters comprising the rate characteristic, the pitch characteristic, the volume characteristic, and the break characteristic.

9. The computer system of claim 8, wherein execution of the instructions further causes the computer system to perform a pre-processing operation, a real-time operation, or a post-processing operation.

10. The computer system of claim 8, wherein the first audio waveform is generated in real-time.

11. The computer system of claim 8, wherein the second audio waveform is a pre-saved audio waveform stored in a repository of waveforms.

12. The computer system of claim 8, wherein the first audio waveform is output from a text-to-speech generator.

13. The computer system of claim 8, wherein the instructions are further executable by the computer system to:
- use a speech-to-text generator to generate a transcript of a human who is speaking; and
- feed the transcript as input to the text-to-speech generator to generate the first audio waveform.

14. The computer system of claim 8, wherein the first audio waveform corresponds to a source of text that includes between 1 and 50 words.

15. The computer system of claim 8, wherein the first audio waveform corresponds to a source of text that includes more than 10 words.

16. A method for dynamically modifying intonations in a first audio waveform to match intonations that are detected in a second audio waveform, said method comprising:
- accessing a first audio waveform representing output from a text-to-speech generator operating on a source of text, wherein the text-to-speech generator is configured to generate the first audio waveform based on a source of text and a set of parameters comprising a rate characteristic, a pitch characteristic, a volume characteristic, and a break characteristic;
- accessing a second audio waveform;
- identifying a first intonation embodied within the first audio waveform, the first intonation being associated with a unit of pronunciation included in the first audio waveform;
- identifying a second intonation embodied within the second waveform, wherein the second intonation is associated with the same unit of pronunciation, which is also included in the second audio waveform; and
- modifying, using a frequency-domain transformation or programmatically generated markup commands, the first audio waveform by modifying the first intonation of the first audio waveform until the first intonation matches, in accordance with a pre-defined tolerance, the second intonation from the second audio waveform, and wherein said modifying includes adjusting one or more of the set of parameters comprising the rate characteristic, the pitch characteristic, the volume characteristic, and the break characteristic.

17. The method of claim 16, wherein the first waveform and the second waveform are associated with the source of text.

18. The method of claim 16, wherein the pre-defined tolerance is between 0% and 5%.

19. The method of claim 16, wherein the pre-defined tolerance is less than about 5%.

* * * * *